United States Patent [19]

Bulgrien

[11] Patent Number: 5,083,647
[45] Date of Patent: Jan. 28, 1992

[54] METHOD OF CONTROLLING CLUTCHES

[75] Inventor: Garth H. Bulgrien, Ephrata, Pa.

[73] Assignee: Ford New Holland, Inc., New Holland, Pa.

[21] Appl. No.: 645,171

[22] Filed: Jan. 24, 1991

[51] Int. Cl.$^5$ .................. B60K 41/02; B60K 41/22; B60K 41/28
[52] U.S. Cl. .................. 192/3.58; 192/0.033; 192/83; 192/109 F; 364/424.1
[58] Field of Search .................. 192/3.58, 0.033, 0.052, 192/83, 109 F, 3.63; 364/424.1

[56] References Cited

U.S. PATENT DOCUMENTS

| 3,352,392 | 11/1967 | Black et al. ............... 192/109 F X |
| 4,632,234 | 12/1986 | Bardoll et al. ............... 192/3.58 |
| 4,799,160 | 1/1989 | Arbeille et al. ............... 192/3.58 X |
| 4,854,433 | 8/1989 | Tellert ............... 192/3.58 X |
| 4,874,070 | 10/1989 | Nellums et al. ............... 192/0.052 |
| 5,002,166 | 3/1991 | Leigh-Monstevens et al. ... 192/83 X |

FOREIGN PATENT DOCUMENTS

| 54-20525 | 2/1979 | Japan ............... 192/0.052 |
| 66-60334 | 4/1985 | Japan ............... 192/83 |
| 1-119434 | 5/1989 | Japan ............... 192/3.58 |
| 2080910 | 2/1982 | United Kingdom ............... 192/3.58 |

Primary Examiner—Rodney H. Bonck
Attorney, Agent, or Firm—Griffin Branigan & Butler

[57] ABSTRACT

In a power shift transmission system, two tables of values are established for modulating a clutch actuation signal. When a clutch pedal is depressed below a limit position, both tables are accessed to obtain a pair of values, and the value which will result in the lower clutch pressure is used to modulate the actuation signal. One table is accessed in accordance with clutch pedal position and the other table is accessed in accordance with the selected gear speed ratio and engine speed. The arrangement prevents overheating of the clutch by the energy applied to it as a result of stalling the engine immediately after clutch inching.

18 Claims, 3 Drawing Sheets

METHOD OF CONTROLLING CLUTCHES

CROSS REFERENCE TO RELATED APPLICATIONS

This application is related to my prior application Ser. No. 07/444,312 filed Dec. 1, 1989, (Application A) now abandoned, and my copending applications Ser. Nos. 07/621,159 filed Nov. 30, 1990 (Application B) and 07/645,172 filed concurrently herewith (Application C), the disclosures of which are incorporated herein by reference. The foregoing applications are assigned to Ford New Holland, Inc., assignee of the present application.

FIELD OF THE INVENTION

The present invention relates to pedal control of transmission clutches and more particularly to a method of inching clutch control wherein the maximum inching pressure is controlled as a function of engine speed and gear selection.

BACKGROUND OF THE INVENTION

Copending Application A discloses a transmission system wherein a microprocessor senses the rate of rotation of input and output shafts, and the positions of a gearshift lever and a clutch pedal to control the selection and energization of clutches in a transmission to thereby control the selection of the gear speed ratio between the input and output shafts. To improve clutch life or durability in such a system, my copending application B proposes a method of clutch control wherein the range of clutch pedal positions available for operator control is limited, and wherein energization of a selected clutch is under microprocessor control and independent of clutch pedal position when the clutch pedal is released above a position defined as the full pressure point. For clutch pedal positions below the full pressure point, the position of the clutch pedal is sensed and converted to a signal for controlling clutch pressure. When the clutch pedal is released to or above the full pressure point, the position is sensed and the microprocessor generates a ramp signal which linearly varies with time so that the clutch pressure is increased to its maximum value in a short interval of 1 to 2 seconds.

While this method does improve the durability of clutches by restricting the ability of the operator to slip a clutch, the ability of the clutch to dissipate heat may be exceeded under certain conditions. By way of example, the energy available to over-heat and damage a clutch during the ramp to full pressure at the full pressure point of the clutch pedal is a function of the square of the engine RPM. The worst case condition results from slipping the clutch at maximum engine speed and maximum available inching pressure until the clutch temperature stabilizes, and then releasing the clutch pedal and stalling the engine. The kinetic energy of the flywheel and other rotating parts is converted to heat in the clutch. The power into the clutch during a stall is much higher than the steady state power dissipation capacity of the clutch, so the temperature of the clutch plates rises. The amount of the temperature increase is determined primarily by the quantity of energy which the clutch must absorb and the thermal capacity (heat sink capability) of the clutch. The steady state temperature during inching plus the temperature rise during a stall should result in a low enough temperature to insure clutch durability, a condition not always obtainable with the above method.

When operating at a reduced engine speed, the stall energy is significantly reduced, which means that the steady state temperature during inching may be higher. Also, it becomes impractical to quickly stall the engine at speeds below 4-5 mph, thus higher steady state inching temperatures are practical as lower gears are selected. Taking advantage of these facts, the present invention provides a method of clutch control wherein the maximum inching pressure is controlled as a function of engine speed and gear selection, or pedal position depending upon which control will result in the lowest clutch pressure.

SUMMARY OF THE INVENTION

An object of the invention is to provide a novel method of clutch control which prevents over-heating of the clutch as a result of engine stall immediately after inching.

A further object of the invention is to provide a method of clutch control wherein the actuation signal applied to a clutch in response to actuation of a clutch pedal may have first magnitude which is determined by the clutch pedal position or a second magnitude which is determined by the engine speed and the selected gear.

In accordance with the principles of the present invention, two tables are provided, each table storing values which are used to modulate a clutch actuation signal. The values in the first table are accessed according to the position of a clutch pedal and are chosen such that the range of clutch pedal positions available for operator control is limited. The values in the second table are accessed according to the engine speed and selected gear and are chosen such that, if used to modulate the clutch actuation signal over a period of time sufficient for the clutch to reach a steady state temperature, followed by stalling of the engine, the stall input to the clutch will not cause the heat dissipation capacity of the clutch to be exceeded. When the clutch pedal is depressed below a limiting position, both tables are accessed to obtain two values. These values are compared and the one which will result in the lower clutch pressure is used to modulate the clutch actuation signal. Both tables are repeatedly accessed as long as the clutch pedal is below the limiting position. When the clutch pedal is released to or above the limiting position, accessing of the tables is terminated and the clutch pressure is automatically increased to its maximum value as a function of time.

Other objects and advantages of the invention will become apparent upon consideration of the following description and the accompanying drawings.

BRIEF DESCRIPTION OF THE DRAWINGS

FIG. 2 is a graphic plot of time versus clutch pressure when the clutch pedal is above a limit position;

DETAILED DESCRIPTION OF THE INVENTION

Figure 1:
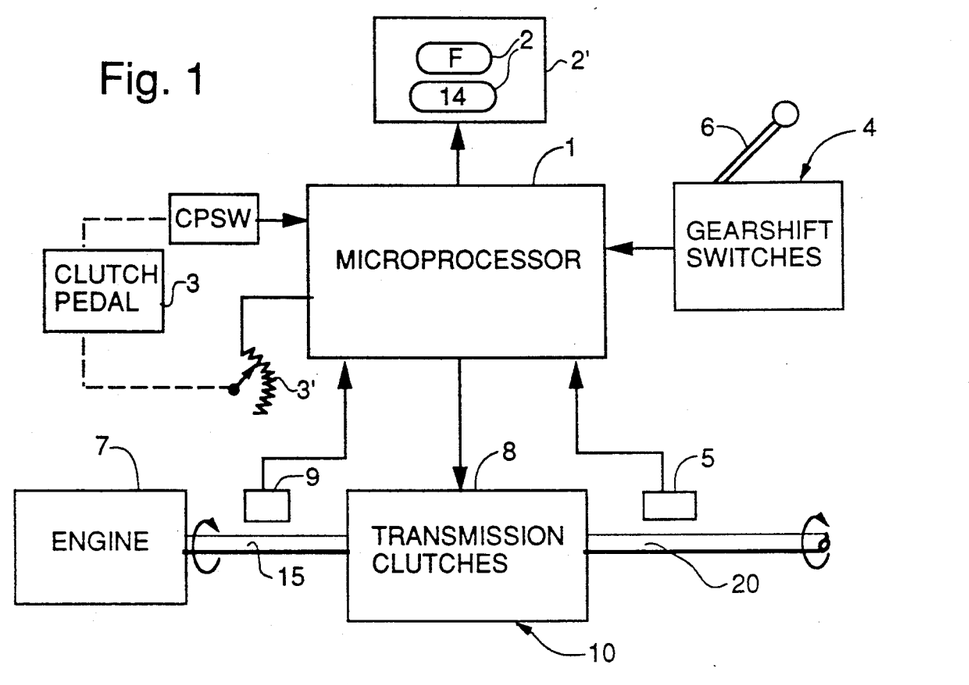
FIG. 1 is a schematic diagram of a power shift transmission system suitable for use in practicing the invention.

FIG. 1 illustrates a power shift transmission system as shown in my aforementioned applications. The power shift transmission system includes a microprocessor 1, a display 2 on an operator's control panel 2', a plurality of gearshift switches 4 which are selectively actuated by manually moving a gearshift lever 6, and a plurality of transmission clutches 8 associated with a transmission 10 which transmits power from a rotating power input shaft 15 to a power output or vehicle drive shaft 20. An engine 7 unidirectionally rotates shaft 15 and a sensor 9 senses rotation of shaft 15 to provide output signals indicating the speed of engine 7. A sensor 5 senses rotation of shaft 20 to provide output signals representing vehicle speed. An operator-actuated clutch pedal 3 controls a potentiometer 3' and an analog output signal from the potentiometer is applied to microprocessor 1 to develop modulating signals which are applied to a selected clutch in a final set of clutches in transmission 10. The clutch pedal 3 also actuates a clutch pedal switch CPSW when the pedal is depressed to its limit of travel.

The gearshift switches 4 are Hall-effect switches or similar devices which are actuated by a magnet or magnets carried on the gearshift lever 6. Microprocessor 1 periodically samples the clutch pedal switch, the output of potentiometer 3', the switches 4, and the outputs of the speed sensors 5 and 9, and in response to the sensed conditions controls transmission clutches 8 to "select gears", i.e. select the direction and rate of rotation of output shaft 20 relative to input shaft 15.

Figure 3:
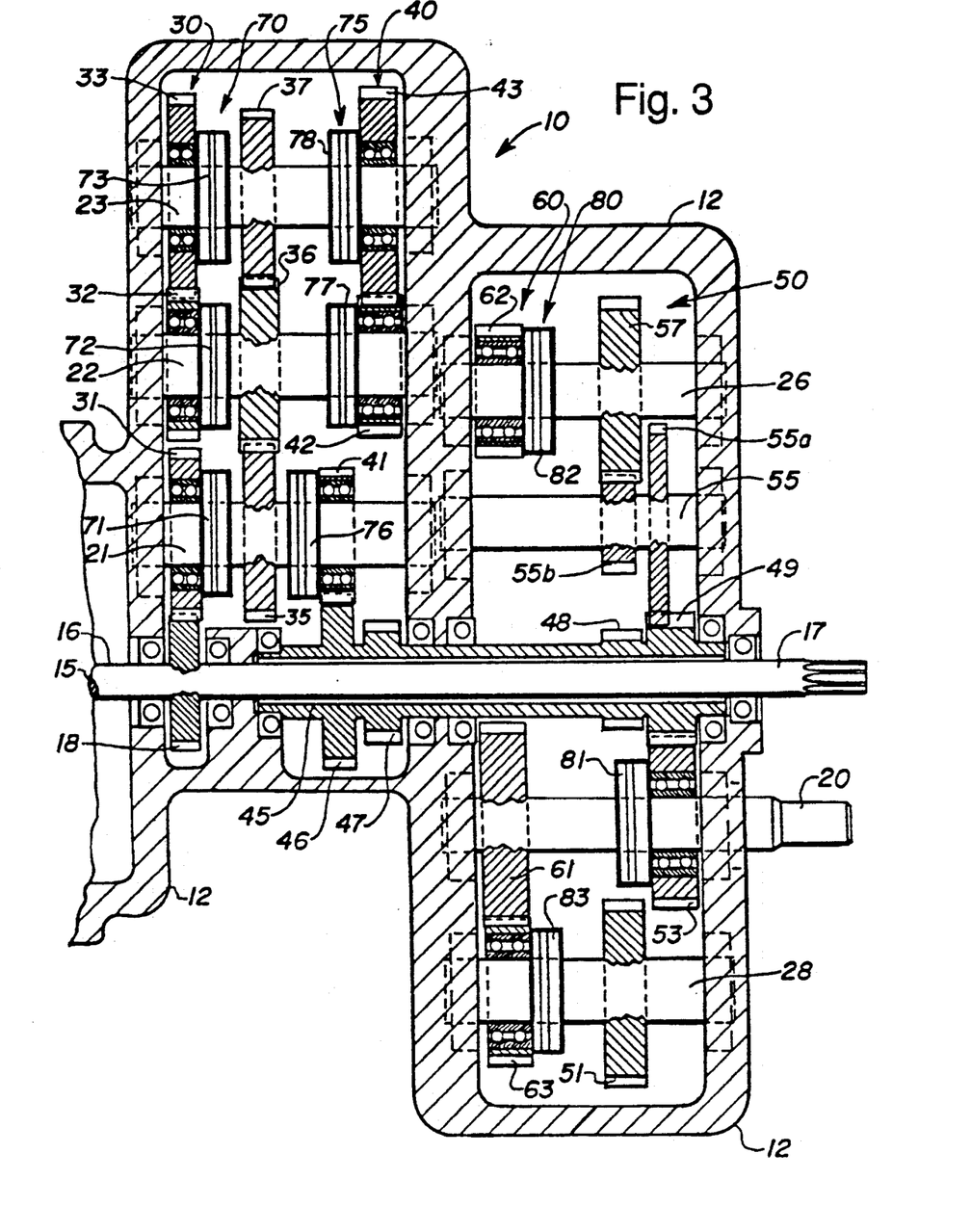
FIG. 3 is a schematic planar development of a three-dimensional transmission.

FIG. 3 is a schematic planar development of the three-dimensional transmission. Reference may be made to my above-referenced applications for a complete description of the transmission, the following brief description being provided only to illustrate a suitable apparatus for practicing the present invention.

As shown in FIG. 3, the transmission 110 includes an exterior casing 12 forming a framework for supporting the power input shaft 15 rotatably journalled on the casing 12 at a central location extending entirely through the transmission 10 from an engine end 16, which receives rotational power directly from the engine 7, to a drive end 17 at the opposing end of the transmission 10, which can be used as a power takeoff shaft. The transmission includes a first jack shaft 21, a second jack shaft 22, a third jack shaft 23, a fourth jack shaft 26, a fifth jack shaft 28, the shaft 55 of a double transfer gear and the output shaft 20. Each of shafts 20, 21, 22, 23, 26, 28 and 55 is journalled by bearings rotatably supporting the respective shafts for rotation within the casing 12.

The power input shaft 15 is provided with a drive pinion 18 splined thereto for rotation therewith at the engine end 16 of the power input shaft 15. The drive pinion 18 is drivingly engaged with a primary drive gear set 30. More specifically, the drive pinion 18 is directly engaged with a first drive gear 31 rotatably mounted on the first jack shaft 21 for rotation independently of the first shaft 21. The drive pinion 18 is also directly engaged with a third drive gear 33 rotatably mounted on the third jack shaft 23 for rotation relative thereto. The third drive gear 33 is meshed in engagement with a second drive gear 32, which in turn is rotatably mounted on the second jack shaft 22. Each of the drive gears 31, 32 and 33 is journalled by bearings mounted on their respective jack shafts and driven by the power input shaft 15 by virtue of direct or indirect engagement with the drive pinion 18. Each of the drive gears 31, 32 and 33 is sized differently to provide different speeds of rotation thereof when rotated by the drive pinion 18.

Each of the jack shafts 21, 22 and 23 is provided with a corresponding fixed gear 35, 36 and 37, respectively. The second fixed gear 36 is drivingly engaged with both the first fixed gear 35 and the third fixed gear 37 so that the rotation of any one of the jack shafts 21, 22 and 23 will effect a simultaneous rotation of all the other jack shafts 21, 22 and 23. Since all the fixed gears 35, 36 and 37 are identical in size, the first jack shaft 21, the second jack shaft 22 and the third shaft 23 will rotate at identical speeds.

The transmission 10 is also provided with an intermediate gear set 40 corresponding to the primary drive gear set 30 and including a first intermediate gear 41 mounted on the first jack shaft 21 for rotation relative thereto, a second intermediate gear 42 rotatably mounted on the second jack shaft 22, and a third intermediate gear 43 rotatably supported on the third jack shaft 23. The intermediate gears 41, 42 and 43 are differently sized to effect a different speed ratio particularly when combined with the differently sized drive gears 31, 32 and 33 of the primary drive gear set 30, as will be described in greater detail below. The first and third intermediate gears 41, 43 are engaged with a transfer hub assembly 45 as will be described below, while the second intermediate gear 42 is drivingly engaged with the third intermediate gear 43. Like the primary drive gear set 30, each intermediate gear 41, 42 and 43 is journalled by bearings mounted on the corresponding jack shaft 21, 22 and 23 to permit independent rotation therebetween.

The intermediate gear set 40 is engaged with a transfer hub assembly 45 rotatably supported from the casing 12 concentric with the power input shaft 15. The transfer hub assembly 45 includes a first transfer gear 46 drivingly engaged with the first intermediate gear 41 and a second transfer gear 47 drivingly engaged with the third intermediate gear 43. The transfer hub assembly 45 is also provided with a co-joined third transfer gear 48 and fourth transfer gear 49 to transfer rotational power from the intermediate gear set 40 to a transfer gear set 50.

The third transfer gear 48 is drivingly engaged with a reverse transfer gear 51 fixed to the fifth jack shaft 28. Likewise, a high-speed transfer gear 53 is rotatably journalled on the power output shaft 20. A double transfer gear 55 having a shaft-like configuration and integral gear members 55a and 55b is rotatably supported in the casing 12. The gear member 55a is also drivingly engaged with the fourth transfer gear 49, while the gear member 55b is engaged with a low-speed transfer gear 57 fixedly secured for rotation with the fourth jack shaft 26.

A final drive gear set 60 includes a high-speed final gear 61 rigidly secured to the power output shaft 20 for rotation therewith, a low-speed final gear 62 rotatably journalled by bearings on the fourth jack shaft 26 for rotation independently relative thereto, and a reverse final gear 63 rotatably journalled on the fifth jack shaft 28 for rotation relative thereto. The final drive gear set 60 is interengaged for simultaneous rotation such that the high-speed final gear 61 fixed to the power output shaft 20 is operatively intermeshed with both the low-speed final gear 62 and the reverse final gear 63.

The transmission includes three clutch sets 70, 75 and 80 operable to effect rotation of the various gears rotatably mounted on jack shafts. The initial clutch set 70 includes a first clutch 71 mounted on the first jack shaft 21, a second clutch 72 mounted on the second jack shaft 22 and a third clutch 73 mounted on the third jack shaft 23. Each clutch 71, 72 73 of the initial clutch set 70 is operable to engage the corresponding drive gear 31, 32 and 33 to effect rotation of the corresponding jack shaft 21, 22 and 23 with the corresponding drive gear 31, 32 and 33 at the speed the drive gear is rotating. Likewise, an intermediate clutch set 75 includes first, second and third intermediate clutches 76, 77 and 78, respectively, mounted on the first, second, and third jack shafts 21, 22 and 23, respectively, for engagement with the corresponding intermediate gear 41, 42 and 43 at the speed at which the corresponding jack shaft is being driven.

A final clutch set 80 includes a high-speed final clutch 81 mounted on the power output shaft 20 and engageable to couple the high-speed transfer gear 53 to the high-speed final gear 61 when so engaged. The final clutch set 80 also includes a low-speed final clutch 82 mounted on the fourth jack shaft 26 to effect a coupling, when engaged, between the low-speed transfer gear 57 and the low-speed final gear 62. Likewise, the final clutch set 80 also includes a reverse final clutch 83 mounted on the fifth jack shaft 28 for selectively coupling the reverse transfer gear 51 to the reverse final gear 63. To attain any given speed of rotation of the power output shaft 20 for a given speed of rotation of the power input shaft, only one selected clutch of each clutch set 70, 75, 80 is engaged at a time. The engagement of two clutches of any one clutch set 70, 75 and 80 has the effect of locking the transmission 10.

With all of the components of the transmission 10 situated as described above, transmission 10 can transmit a given engine speed received by the engine end 16 of the power input shaft 15 to the output shaft 20 in twenty-seven different speed variations with eighteen forward speeds and nine reverse speeds. It can be seen that the drive pinion 18 constantly delivers rotational power from the engine to the primary gear set 30 such that the first, second, and third drive gears 31, 32 and 33 are constantly driven with the drive pinion 18 relative to the respective jack shaft 21, 22 and 23 on which the gears of the primary drive gear set 30 are respectively mounted. The engagement of one of the clutches 71, 72 and 73 of the initial clutch set 70 effects an engagement of the corresponding drive gear 31, 32 or 33 with the respective jack shaft 21, 22 or 23 and effects rotation of the jack shafts 21, 22 and 23 at the speed at which the corresponding drive gear is being rotated. Since the intermeshed fixed gears 35, 36 and 37 are of identical size, rotation of any one of the jack shafts 21, 22 and 23 will effect rotation of all three jack shafts 21, 22 and 23 at identically the same speed as the drive gear 31, 32 and 33 engaged by the selected clutch of the initial clutch set 70.

The engagement of one of the clutches of the initial clutch set 70 will effect a corresponding rotation of the first, second, and third jack shafts 21, 22 and 23 at a selected speed corresponding to the corresponding drive gear from the primary drive gear set 30. A subsequent engagement of one of the clutches 76, 77 and 78 of the intermediate clutch set 75 effects an engagement between the corresponding intermediate gear from the intermediate gear set 40 with the rotating jack shaft corresponding to the selected intermediate clutch at the speed at which the jack shafts 21, 22 and 23 are rotating. Since all of the intermediate gears of the intermediate gear set 40 are engaged with the transfer hub assembly 45, directly or indirectly, which in turn is engaged with the transfer gear set 50, an engagement of one of the clutches of the intermediate clutch set 75 effects a rotation of all gears of the intermediate gear set 40, the transfer hub assembly 45, all of the transfer gears 46, 47, 48 and 49 and all of the gears in the transfer gear set 50, as well as the corresponding rotation of both the fourth and fifth jack shafts 26, 28 due to a fixed engagement with the corresponding transfer gears 51, 57.

Finally, an engagement of one of the clutches 81, 82 and 83 of the final clutch set 80 will transfer rotational power from the corresponding transfer gear to the corresponding final gear 61, 62 and 63 of the final drive gear set 60 to cause a rotation of the power output shaft 20 at the speed ratio corresponding to the combination of the respective gears engaged by the activated clutches of the initial clutch set 70, the intermediate clutch set 75 and the final clutch set 80.

The torque transmitting elements of the clutches in transmission 10 are hydraulically actuated to transfer torque. Solenoid operated valves (not shown) control the pressure applied to clutch plates and thus the torque transferred to the output shaft 20 to move the vehicle.

The clutches 81, 82 and 83 in the final clutch set 80 serve as inching clutches. As explained in my aforementioned Application A, clutches in the transmission may be calibrated after a tractor has been assembled or when the tractor is serviced. During calibration, the microprocessor stores a digital value $I_s$ where $I_{MAX} > I_S > I_{MIN}$. The digital value $I_s$ represents the magnitude of a pulse width modulated current signal which, when applied to a solenoid of a solenoid operated valve, allows hydraulic fluid controlled by the valve to apply to the clutch plates a pressure just less than that required to transmit torque through the clutch. A separate value $I_s$ is stored for each clutch.

$I_{MAX}$ represents the maximum current signal which may be applied to a clutch solenoid. The hydraulic pressure applied to a clutch varies inversely with respect to the current applied to the solenoid of the clutch. Thus, when a current $I = I_{MAX}$ is applied to a clutch solenoid, the lowest hydraulic pressure is applied to the clutch plates and when a current $I = I_{MIN}$ is applied to the solenoid the maximum hydraulic pressure is applied to the clutch plates.

In the transmission system described above, it is possible for an operator to depress the clutch pedal 3 and slowly release the clutch pedal while the transmission is in a selected gear. As the clutch pedal is released, the potentiometer 3' produces an analog output signal which is generally linearly proportional to the pedal position. This analog signal is applied to microprocessor 1 which uses it to modulate I. The microprocessor converts the signal to a digital signal $I_{CP}$ and subtracts it from the stored digital value representing $I_s$. The resulting digital value is then used by the microprocessor to generate the pulse width modulated current signal I which is applied to the solenoid of clutch 81, 82 or 83, depending upon the selected gear.

As the clutch pedal is released, $I_{CP}$ increases, thereby causing a decrease in I and thus an increase in the hydraulic pressure applied to the clutch plates, so that a higher torque is applied to output shaft 20. Initially, the clutch may slip, the degree of slippage being dependent on the gear (gear speed ratio) which has been preselected, the position of the clutch pedal, and the drawbar load of the tractor in which the transmission is located. Power from engine 7 is dissipated as friction-generated heat in the clutch thus wearing the clutch and heating the transmission oil. Subsequently, as the clutch pedal is further released so that the pressure exerted by the clutch plate is increased, slippage of the clutch will decrease. Unless the load on the drawbar exceeds the capacity of the clutch, a point will be reached such that the pressure exerted by the clutch is sufficient to prevent slippage.

From the foregoing explanation it is evident that the operator may utilize clutch pedal 3 to inch or slip a clutch regardless of the engine speed, the gear selected, or the load on the drawbar. As disclosed in my copending application B, a portion of the clutch pedal control is removed from the control of the operator by making the clutch control independent of pedal position under clutch conditions of high horsepower.

Figure 4:
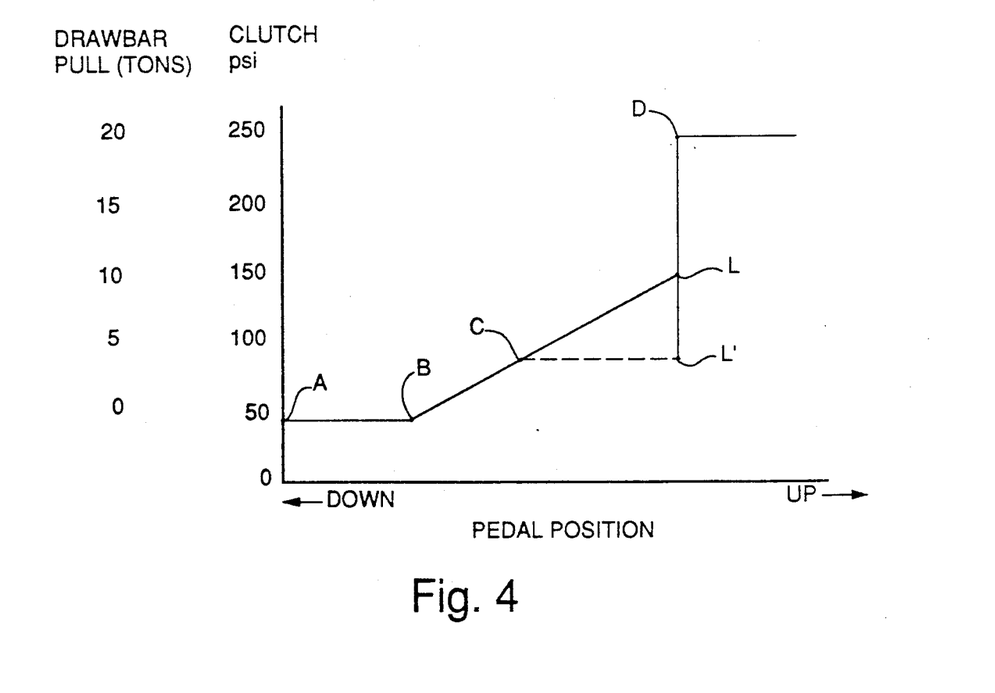
FIG. 4 is a graphic plot showing clutch pedal position versus clutch pressure and useful in explaining the invention; and, FIGS. 5A and 5B are flow diagrams of a microprocessor program which may be utilized to practice the invention.

FIG. 4 is a graph illustrating clutch pedal position verses clutch pressure and drawbar pull. When the pedal is fully down (point A), and for a first range of pedal positions between points A and B, the clutch pressure remains substantially constant at a low value. Thus, during initial upward movement of the clutch pedal no torque is transmitted to the output shaft 20.

Figures 2, 5A, 5B:
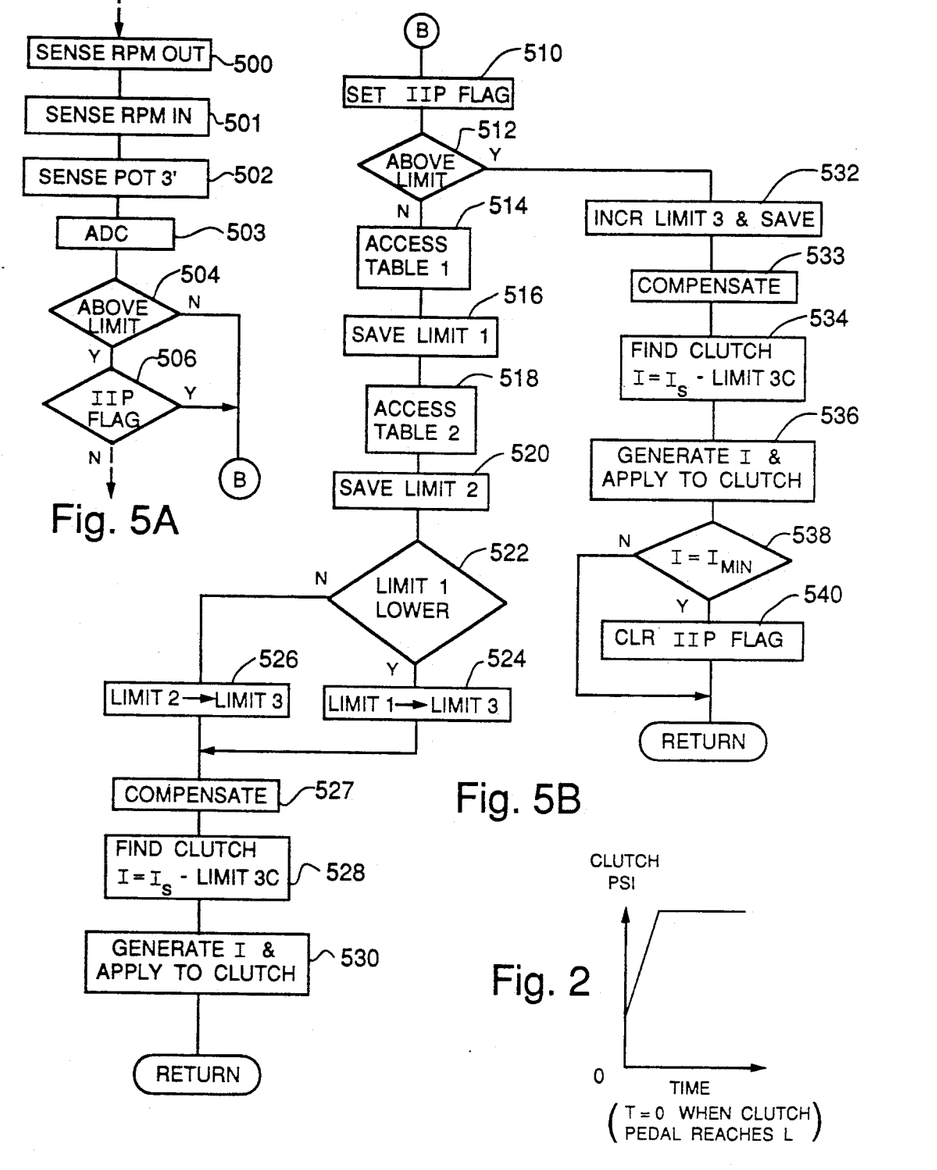

As the clutch pedal is further released to move through a second range of pedal positions between B and L, the output of the clutch pedal potentiometer 3' is used by microprocessor 1 to select from a table values for modulating I so that the clutch pressure increases generally linearly as the pedal position changes. As the operator releases the clutch pedal above point L, he loses inching clutch control. Microprocessor 1 takes over and automatically and repeatedly decrements I so that within a short interval of 1 to 2 seconds, the hydraulic pressure applied to the clutch is raised to its maximum value. That is, the clutch pressure is linearly increased with time as shown in FIG. 2. The ramp between points L and D is chosen to be gentle enough to avoid excessive jerkiness at the full pressure point L as the microprocessor assumes full control, but steep enough to limit the clutch slip time and consequent clutch damage.

While the response indicated by the line ABCLD is suitable when the lowest gear speed has been selected, clutch damage could result under a heavy drawbar load if a higher gear speed has been selected. Therefore, as suggested in my copending application B, the response to the inching clutch pedal position may be modified as indicated by the curve ABCL'D so that at higher gear speeds the clutch pedal control is further restricted. At higher gears, the clutch pressure is maintained generally constant over the range of pedal positions from point C to point L'. At point L' the microprocessor 1 takes over as previously described and automatically modulates I so that the clutch pressure increases linearly with time as shown in FIG. 2 and maximum clutch pressure is exerted within 1 to 2 seconds. As disclosed in Application B, the responses illustrated in FIG. 4 are obtained by providing two tables of modifier values in a non-volatile memory and accessing one or the other table depending upon the clutch pedal position and the active gear.

From FIG. 4 it is seen that the operator can inch at light or no-load conditions and can use the clutch pedal to start a heavy load, but cannot find a clutch pedal position where the clutch is required to slip continuously at high horsepower. However, under some circumstances it is possible for the operator to control the clutch pedal 3 in a manner which may result in damage to the clutches. For example, assume that the operator has the engine 7 running at maximum speed and holds the clutch pedal in a position at or near the maximum available inching pressure, that is, near point L in a low gear or between points C and L' if in a higher gear. As the pedal is held in this position, the temperature of the clutch will rise and stabilize. If the operator now suddenly releases the clutch pedal and stalls the engine, the kinetic energy of the engine flywheel and other rotating parts is converted into heat. This power is greater than the steady state power dissipation capacity of the clutch. The resulting rise in the temperature of the clutch may thus cause damage to the clutch.

Since the temperature increase resulting from a stall is determined primarily by the quantity of energy which must be absorbed, and since this energy is determined by the speed of engine 7 and the active gear speed, the present invention provides for modification of the response to clutch pedal position so that the response is dependent not only on the active gear but also on the speed of engine 7. This is accomplished by providing two tables in the memory of microprocessor 1.

The first table is addressed by an address value derived from the position of clutch pedal 3, and contains values for modifying the clutch actuation signal so as to obtain clutch pressures according to pedal position as represented in FIG. 4 by the curve ABCL.

The second table is addressed by an address derived from the engine RPM sensor 9 and the active gear. The second table also stores values for modifying the clutch actuation signal. The values stored in this table are chosen such that, when the clutch actuation signal I is modulated by a value from the table the resulting clutch pressure is low enough so that, if the pressure is maintained until the clutch temperature stabilizes, and the clutch pedal is released to stall the engine, the resulting stall power input to the clutch will not cause the heat dissipation capacity of the clutch to be exceeded. This second table eliminates the need for implementing the clutch pressure versus pedal position function indicated by curve segment CL' in FIG. 4.

According to the present invention, both the first and second tables are repeatedly accessed while the clutch pedal 3 is depressed. A value read from the first table is compared to the value read from the second table and the value which will result in the lower clutch pressure is used to modulate the clutch actuation signal.

The method of inching control according to the present invention may be implemented in different ways. For example, the microprocessor may be programmed to execute routines as illustrated in FIGS. 5A and 5B.

The microprocessor 1 periodically interrupts (at intervals of say 5 milliseconds) any routine it is executing and performs a routine during which it sequentially samples the outputs from the gearshift switches 4, sensors 5 and 9, potentiometer 3' and switch CPSW. As shown in FIG. 5A, the output shaft or ground speed sensor 5 is sampled at step 500 and the input shaft or engine speed sensor 9 is sampled at step 501. The sensors 5 and 9 may be a magnetic or other type devices which sense teeth on gears mounted on shafts 15 and 20. The microprocessor is programmed to convert the pulses from sensors 5 and 9 into digital values representing the RPM of shafts 15 and 20. At step 502 the analog output of potentiometer 3' is sensed and at step 503 the microprocessor converts the analog signal to an 8-bit digital value representing the position of pedal 3. At step 504 this digital value is tested to determine if the pedal is in a position higher than that corresponding to the pressure limit point L of FIG. 4. This may be accomplished by accessing a location which stores a value corresponding to the L position of the pedal. The value in the accessed memory location is then compared at step 504 with the digital pedal position signal derived at step 503 to determine if the pedal is above the limit position.

If the test at step 504 indicates that the pedal is not above the limit point the program branches to the inching control routine shown in FIG. 5B where it sets an Inch In Progress flag (IIP) at step 510. On the other hand, if the test at step 504 indicates that the clutch pedal 3 is above the limit point, a test is made at step 506 to determine if the IIP flag is set. If it is set, the program branches to step 510. If it is not set, the program continues in its normal course, testing the other inputs to the microprocessor.

For purposes of the following description, it is assumed that the clutch pedal 3 is depressed to some position below point L when the output of potentiometer 3' is sensed at step 502. Step 503 is executed and the test at step 504 proves false so that the program branches to step 510 where the IIP flag is set. At step 512 the pedal position value produced at step 503 is again tested to see if the pedal is in a position above the limit position L. Under the assumed condition the test proves false and the program moves to step 514.

At step 514, the pedal position value developed at step 503 is used to address Table 1. This table stores 256 values which may be used to modulate the actuation signal applied to the clutch 81, 82 or 83 which is being inched so that the clutch pressure may vary according to pedal position as illustrated by the curve ABCL shown in FIG. 4.

At step 516, the value read from the table is saved in a register or memory location LIMIT 1 for subsequent use.

At step 518, Table 2 is accessed using an address derived by combining a value representing the selected or active gear with a value representing the rate or rotation of shaft 15. In this regard, the microprocessor includes two memory locations for storing the rate of shaft rotation derived from repeated sampling of sensors 5 and 9, and a memory location PG for storing an indication of the present or active gear. Like Table 1, Table 2 stores values which may be used to modulate the actuation signal applied to the clutch being inched, so as to control the clutch pressure. The values stored in Table 2 will vary depending on such factors as clutch capacity and the power which must be dissipated by a clutch upon stalling. The values are calculated from the physical characteristics of engine 7 and the transmission clutches and are stored in Table 2 which, like Table 1, must be located in a non-volatile memory so that the values are not lost when power is turned off.

Each value stored in Table 2 is such that if the value is used to modify the clutch actuation signal for a period long enough for the clutch to reach a steady state temperature, and the engine 7 is then stalled, the resulting temperature rise will not exceed the heat dissipation capacity of the clutch.

At step 520, the value read from Table 2 is saved at a location LIMIT 2. Next, step 522 is executed to compare the value read from Table 1 with the value read from Table 2. Whichever value, when used to modulate the clutch actuation signal, will result in the lowest clutch pressure, will be used. If the comparison at step 522 shows that the value from Table 1 (saved at LIMIT 1) is lower then LIMIT 1 is transferred to a location LIMIT 3 at step 524. On the other hand, if the test at step 522 shows that the value from Table 2 is lower then LIMIT 2 is transferred to LIMIT 3 at step 526. From step 524 or 526, the program moves to step 527 where LIMIT 3 is modified to compensate for centrifugal force acting on hydraulic fluid in the clutch, as disclosed in Application C. The compensated value is stored at location LIMIT 3C. After the compensation is accomplished the program advances to step 528.

Since there is a different stored clutch calibration value $I_s$ for each of the clutches 81, 82 and 83, step 528 first determines which of these clutches is active, fetches from memory the value $I_s$ for the active clutch and subtracts from $I_s$ the value in LIMIT 3C. The resulting digital value I is then used at step 530 to generate the pulse width modulated signal I which is applied to the active clutch.

After step 530 is executed, the program returns to the routine of FIG. 5A at the step which follows step 506. It will be understood that the microprocessor continues to output the signal I even after the program leaves step 530, this being accomplished by circuits within the microprocessor as is well known in the art. At the next interrupt the program is repeated. The engine speed is updated at step 501, a new pedal position value is developed at step 503 and at step 504 the program branches to FIG. 5B to again access Tables 1 and 2 and develop a new clutch actuation signal which is applied to the active clutch at step 530. These operations continue as long as the clutch pedal position is below the pedal position corresponding to point L of FIG. 4. The only difference, insofar as the present invention is concerned, is that as the pedal moves upwardly (or downwardly), different addresses in Table 1 are accessed at step 514 to read larger (or smaller) values from the table, and different addresses in Table 2 are accessed as the engine speed varies and as the operator shifts to different gears. When the clutch pedal is released above point L, the microprocessor 1 assumes full control and rapidly increases the clutch pressure to its maximum value. This may be accomplished as follows.

During the first execution of the routine of FIG. 5A after the clutch pedal has been released above position L, the above limit test made at step 504 proves true. The program thus moves to step 506 and tests the Inch In Progress flag. Since this flag is still set, the program moves to FIG. 5B as before.

At step 512, the above limit test is again performed and proves true. The program then executes step 532 to increment the value saved at LIMIT 3 when step 524 or 526 was last executed. The incremented value is saved at LIMIT 3 for further use.

At step 533, the value from LIMIT 3 is adjusted to compensate for the effect of centrifugal force on the pressure exerted by hydraulic fluid, and the compensated value is saved at LIMIT 3C.

Next, at step 534 the program determines which gear is the active gear, reads the calibration value $I_s$ for the active clutch 81, 82 or 83, and subtracts the value in LIMIT 3C from $I_s$ to obtain the digital value I.

At step 536 the digital value of I is used to generate the pulse width modulated current signal I which is applied to the active clutch. As explained above, the signal I continues to be applied to the clutch solenoid even after the program leaves step 536.

At step 538, the digital value of I produced at step 534 is compared to $I_{MIN}$ where $I_{MIN}$ is the value of I which, when converted to its pulse width modulated form and applied to the clutch solenoid, results in maximum hydraulic clutch pressure. Assuming $I \neq I_{MIN}$, the program bypasses step 540 and returns to the routine of FIG. 5A.

Each time the routine of FIG. 5A is executed, the test at step 506 will prove true and the program will execute steps 510, 512, 532, 534, 536 and 538 with the value in LIMIT 3 being incremented on each execution of step 532. This results in a progressively smaller value of I being produced at step 534 so that an increasing clutch pressure is produced as illustrated in FIG. 2. The slope of the increase is determined by the incrementing value used at step 532 and the rate at which the routine of FIG. 5A is executed. The values of these parameters should be chosen such that the maximum clutch pressure is reached in about 1-2 seconds. The slope should not be so steep as to cause an excessive "jerk" as the microprocessor assumes control at point L of FIG. 4.

The inching control routine terminates when the hydraulic pressure applied to the clutch reaches its maximum value, that is, when I reaches a minimum value. This is detected at step 538 when the value of I produced at step 534 is compared with a digital value of $I_{MIN}$. The program then clears the Inch In Progress flag at step 540 before returning to the routine of FIG. 5A.

It will be understood that the method of clutch control described above may be practiced with other apparatus, and variations may be made in the disclosed method without departing from the spirit and scope of the invention as defined by the appended claims.

I claim:

1. A method of controlling a clutch in a power shift transmission having plural clutches for selectively coupling an engine driven input shaft to an output shaft at any one of a plurality of gear ratios, and a clutch pedal for selectively controlling modulation of a clutch actuation signal applied to at least one of said clutches to thereby control the pressure of said clutch, said method comprising:

in response to actuation of the clutch pedal modulating the clutch actuation signal with a first signal dependent on clutch pedal position or a second signal which is dependent on engine speed and the selected gear ratio, whichever signal will result in the lower clutch pressure.

2. A method as claimed in claim 1 and including the steps of: establishing two tables of modulation values, assessing the first table by a value derived from the clutch pedal position to obtain said first signal, and accessing the second table by a value derived from the engine speed and the selected gear to obtain said second signal.

3. A method is claimed in claim 1 wherein the step of modulating the clutch actuation signal comprises modulating the clutch actuation signal by the first or the second signal as long as the clutch pedal is depressed to a position below a limit position.

4. A method as claimed in claim 3 and further comprising modulating the clutch actuation signal as a function of time when the clutch pedal is released above the limit position.

5. A method of controlling a clutch in a power shift transmission having plural clutches for selectively coupling an engine driven input shaft to an output shaft at any one of a plurality of gear ratios, and a clutch pedal for selectively controlling modulation of a clutch actuation signal selectively applied to at least one of said clutches to thereby control the pressure of said clutch, said method comprising:

establishing a first table of first values chosen such that, as the first values are accessed according to clutch pedal position and are used to modulate the clutch actuation signal, the range of clutch pedal positions for controlling said one clutch is limited;

establishing a second table of second values chosen such that, if a second value is used to modulate said clutch actuation signal for an interval of time sufficient for the temperature of the clutch to rise to a steady-state temperature, and the engine is subsequently stalled, the heat dissipation capacity of the clutch actuated by the actuation signal is not exceeded;

when the clutch pedal is depressed below a limit position, selecting a pair of values including a first value from the first table and a second value from the second table, and, modulating the clutch actuation signal with the one value of the pair of values read from the table which will result in the lower clutch pressure.

6. A method as claimed in claim 5 wherein the steps of establishing said first and second tables comprises establishing said first and second tables in the form of an addressable non-volatile memory.

7. A method as claimed in claim 5 wherein the step of selecting a pair of values comprises selecting a value from the first table in accordance with the position of the clutch pedal and selecting a value from the second table in accordance with the engine speed and the selected gear ratio.

8. A method as claimed in claim 5 wherein the step of selecting a pair of values is repeated long as the clutch pedal is depressed below the limit position, and the step of modulating the clutch actuation signal comprises modulating the clutch actuation signal with the value from each pair which will result in the lower clutch pressure.

9. A method as claimed in claim 8 and further comprising the step of modulating the clutch actuation signal as a function of time when the clutch pedal is released above the limit position whereby the clutch pressure rises to maximum value.

10. In a power shift transmission system having a plurality of gear speed ratios selectable by actuation of clutches for controlling the transfer of torque from an input shaft to an output shaft, means for selectively actuating said clutches in accordance with a selected gear, and a clutch pedal for controlling the magnitude of an actuation signal selectively applied to one of said clutches, said actuation signal determining the pressure applied to said one clutch, an improved method of clutch control comprising:

establishing a table of values representing the magnitudes of actuation signals which may be applied to said on clutch, said table of values including, for each possible gear speed ratio which may be selected, a plurality of values corresponding to possible rates of rotation of said input shaft;

sensing the rate of rotation of said input shaft;

when said clutch pedal is depressed, selecting from said table one of said values corresponding to the sensed rate of rotation and the gear speed ratio selected;

generating an actuating signal whose magnitude is dependent on the value selected from the table; and, applying said actuating signal to one of said clutches.

11. A method of controlling a clutch in a power shift transmission having plural clutches for selectively coupling an engine driven input shaft to an output shaft at any one of a controlling modulation of a clutch actuation signal applied to at least one of said clutches to thereby control the pressure of said clutch, said method comprising:

in response to actuation of the clutch pedal modulating the clutch actuation signal with a first signal dependent on clutch pedal position or a second signal which is dependent on the selected gear ratio, whichever signal will result in the lower clutch pressure.

12. A method as claimed in claim 11 and including the steps of: establishing two tables of modulating values, assessing the first table by a value derived from the clutch pedal position to obtain said first signal, and accessing the second table by a value derived from the selected gear to obtain said second signal.

13. A method as claimed in claim 11 wherein the step of modulating the clutch actuation signal comprises modulating the clutch actuation signal by the first or the second signal as long as the clutch pedal is depressed to a position below a limit position.

14. A method as claimed in claim 13 and further comprising modulating the clutch actuation signal as a function of time when the clutch pedal is released above the limit position.

15. A method of controlling a clutch in a power shift transmission having plural clutches for selectively coupling an engine driven input shaft to an output shaft at any one of a plurality of gear ratios, and a clutch pedal for selectively controlling modulation of a clutch actuation signal applied to at least one of said clutches to thereby control the pressure of said clutch, said method comprising:

in response to actuation of the clutch pedal modulating the clutch actuation signal with a first signal dependent on clutch pedal position or a second signal which is dependent on engine speed, whichever signal will result in the lower clutch pressure.

16. A method as claimed in claim 15 and including the steps of: establishing two tables of modulation values, accessing the first table by a value derived from the clutch pedal position to obtain said first signal, and accessing the second table by a value derived from the engine speed to obtain said second signal.

17. A method is claimed in claim 15 wherein the step of modulating the clutch actuation signal comprises modulating the clutch actuation signal second signal as long as the clutch pedal is depressed to a position below a limit position.

18. A method is claimed in claim 17 and further comprising modulating the clutch actuation signal as a function of time when the clutch pedal is released above the limit position.

* * * * *